March 3, 1970  R. CASS  3,498,652
CLAMPING DEVICE
Filed July 26, 1968  2 Sheets-Sheet 1
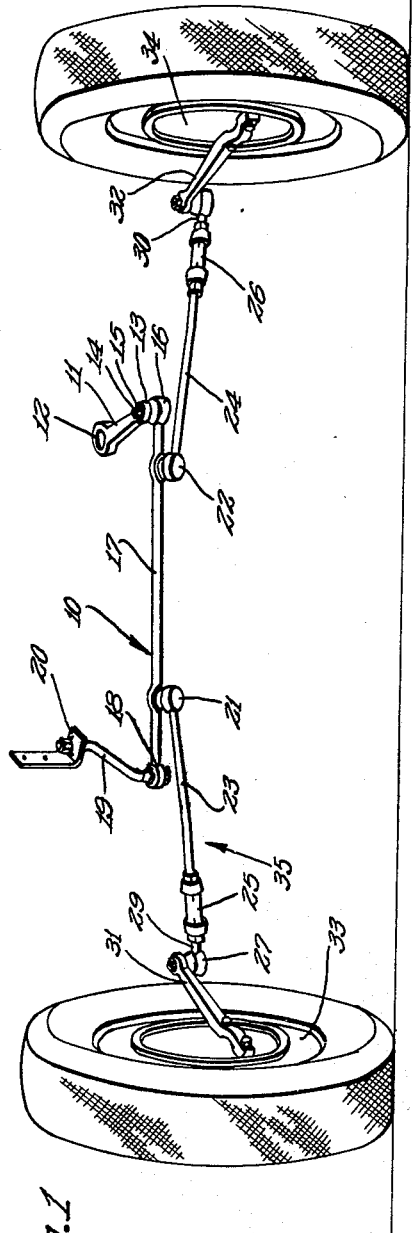
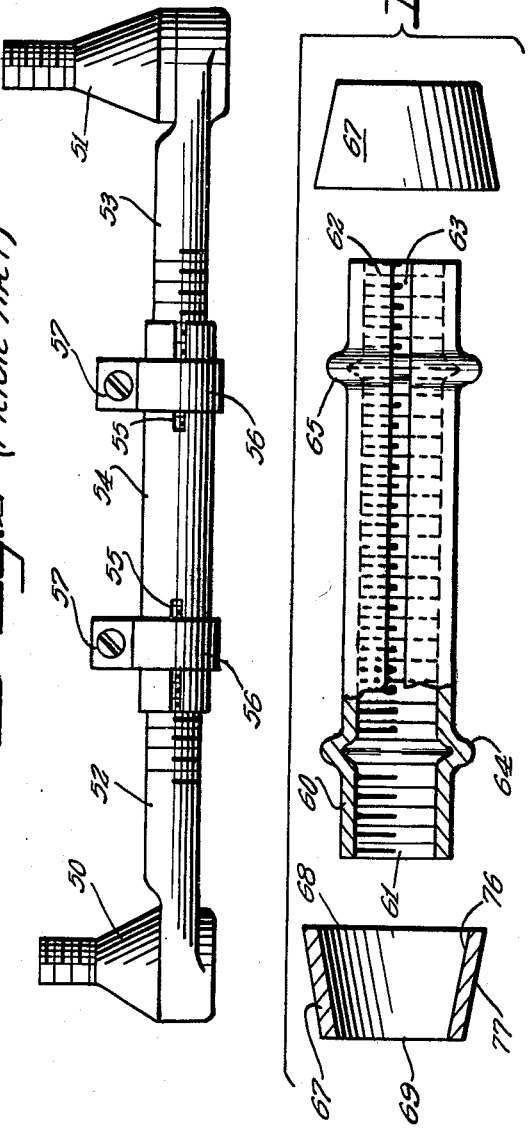
INVENTOR.
Richard Cass
BY  ATTORNEYS March 3, 1970   R. CASS   3,498,652
CLAMPING DEVICE
Filed July 26, 1968   2 Sheets-Sheet 2
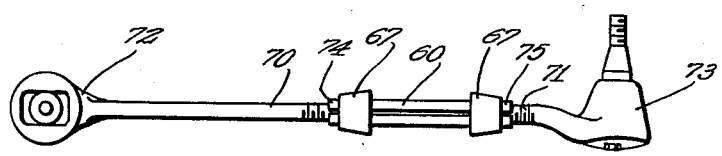
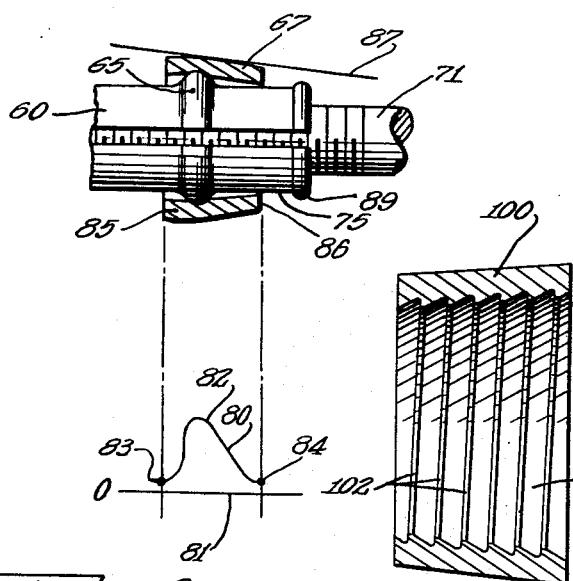
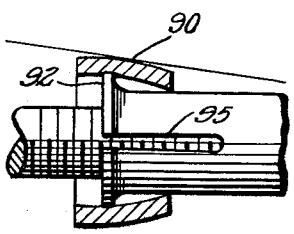
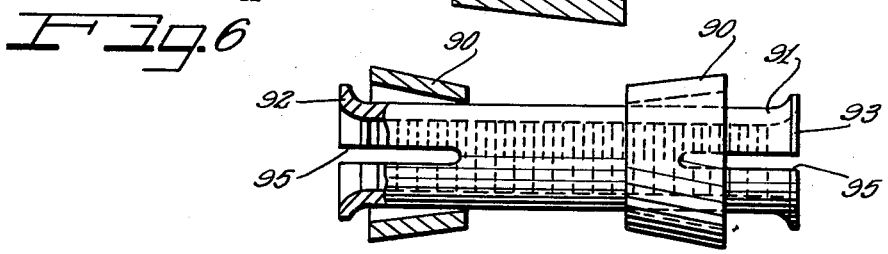
INVENTOR.
Richard Cass
BY Hill, Sherman, Meroni, Gross & Simpson
ATTORNEYS

United States Patent Office 3,498,652
Patented Mar. 3, 1970

3,498,652
CLAMPING DEVICE
Richard Cass, Birmingham, Mich., assignor to TRW Inc., Cleveland, Ohio, a corporation of Ohio
Filed July 26, 1968, Ser. No. 747,878
Int. Cl. F16b 7/06
U.S. Cl. 287—60                                    13 Claims

ABSTRACT OF THE DISCLOSURE

A clamping device for connecting two rod members together. The rod ends are inserted in a hollow split cylinder which has two increased diameter circumferential bulges therearound. Tapered collars are forced over the bulges, near the ends of the cylinder. The tapered collars have an inner diameter smaller than the outer diameter of the bulges, thereby constricting the cylinder into tight gripping relationship with the rod ends and deforming the collars so that they remain around the bulges.

BACKGROUND OF THE INVENTION

Field of the invention

This invention relates to clamping devices and more particularly to a turnbuckle clamping device adapted to increase the frictional engagement between the turnbuckle sleeve and the rod members inserted therein.

Prior Art

Automobile steering linkages and other devices require that two members be joined together in a relationship such that the effective length of the two members can be adjusted. It is standard in the prior art to do this by means of an adjusting turnbuckle consisting of a cylinder or sleeve having internal threads of opposite hand in the ends thereof into which are threaded the rod-like ends of the members.

In order to enhance the gripping relationship of the turnbuckle cylinder around the rod-like members, it has been known in the prior art to split the cylinder near its ends and to place therearound adjustable clamps which can be tightened to constrict the cylinder into tight gripping relationship with the rod-like ends.

While such prior art clamping devices are effective to retain the members in the turnbuckle, they are not adapted to automatic installation machinery thereby substantially increasing the cost of assembling the components. Further disadvantages lie in the fact that many of the prior art devices require adjusting screws or nuts and bolts in connection with the clamping devices which screws or bolts must be loosened to effect adjustment of the length of the combined members. Such screws and nuts and bolts, especially when used in connection with automotive steering linkages, have a tendency to become corroded and freeze in position, thereby increasing the difficulty and cost of adjusting the linkage.

SUMMARY OF THE INVENTION

These difficulties and objections are overcome by the present invention which provides a new method and apparatus for clamping members together. The device is described in connection with a preferred embodiment consisting of a hollow cylinder or sleeve having internal threads of opposite hand in the ends thereof to provide a turnbuckle cylinder. Adjacent either end thereof, the cylinder is provided with circumferential bulges increasing the outer diameter at a localized point. Frusto-conically shaped collars are provided which have an interior diameter at their large end greater than the outer diameter of the cylinder in the area of the bulges and an inner diameter at their small end which is less than the outer diameter of the cylinder at the bulges. The cylinder is split either for its entire length or through the area of the bulges and can therefore be circumferentially compressed or constricted.

The internal diameter of the split cylinder is chosen so as to provide a good mating engagement with the externally threaded rod-like ends of the members to be connected. After threading the ends into the cylinder, the collars are drawn over the bulges and force is applied to the collars so that the cylinder is constricted by reason of the frusto-conically tapered inner diameter of the collars. This constriction in the area of the bulges causes the cylinder to more tightly engage the threaded rod-like ends.

The collars are made sufficiently thin-walled so that they arcuately deform when pulled over the bulges thereby increasing the permanency of the mate between the collars and the cylinder.

Since the only mechanical movement required to assemble the collars around the cylinder is one of moving the collars with respect to the cylinder, the assembly is easily adapted to automatic installation machinery. Further, when it is required to adjust the turnbuckle all that has to be done to release the tension on the rod ends is to withdraw the collars from the bulge areas of the cylinder.

It is therefore an object of this invention to provide a new and improved clamping device.

It is yet another object of this invention to provide an improved clamping device for a turnbuckle which increases the gripping relationship between the turnbuckle cylinder and the members threaded thereinto.

It is a further and more specific object of this invention to provide a new and improved clamping device for steering linkage turnbuckles wherein the turnbuckle cylinder is provided with circumferential bulges, the turnbuckle is split, and hollow tapered collars are drawing over the bulges to constrict the cylinder into tight gripping relationship with the rod-like members threaded thereinto.

Other objects, features and advantages of the present invention will be readily apparent from the following detailed description of certain preferred embodiments thereof taken in conjunction with the accompanying drawings.

BRIEF DESCRIPTION OF THE DRAWINGS

FIGURE 1 is a perspective view of a parallelogram solid centerlink automobile steering linkage incorporating the principles of the present invention:

FIGURE 2 is a longitudinal elevational view of a prior art ball joint tie rod linkage;

FIGURE 3 is an exploded longitudinal elevational view, partially in section, of the improved turnbuckle and clamping device of this invention;

FIGURE 4 is a longitudinal elevational view of a ball joint tie rod linkage incorporating the principles of this invention;

FIGURE 5 is an enlarged fragmentary elevational view of one end of the turnbuckle assembly of FIGURE 4 with a portion in section;

FIGURE 6 is a chart analysis of the stress in the assembly of FIGURE 5;

FIGURE 7 is a longitudinal elevational view with portions in section illustrating another embodiment of the turnbuckle and clamping device of this invention.

FIGURE 8 is a view similar to FIGURE 5 but showing the modified assembly of FIGURE 7.

FIGURE 9 is a sectional view of a modified clamp used with this invention.

DESCRIPTION OF THE PREFERRED EMBODIMENTS

In FIGURE 1, the reference numeral 10 refers generally to an automobile steering linkage of the parallelogram type. The linkage 10 consists of a Pitman arm 11 connected at one end 12 to the steering gear box of the vehicle (not shown) and at the other end 13 to the shank of a ball stud 14 and secured thereto by a nut 15. The ball end of the stud 14 is received in a ball joint housing 16 which has attached thereto or integrally formed therewith an elongated centerlink bar or rod 17 normally projecting at right angles to the shank of the ball stud 14. The centerlink bar 17 is connected at its other end 18 to one end of an idler arm 19 the other end of which is attached to a mounting bracket 20 which may be secured to the frame of the vehicle (not shown). Intermediate the ends of the centerlink 17 the studs of ball joints 21 and 22 are fastened. The ball joints 21 and 22 are on the inner ends of the tie rods 23 and 24. The outer ends of the tie rods 23 and 24 are threaded respectively into one end of turnbuckles 25 and 26. Ball joints 27 and 28 have stems 29 and 30 threaded into the other end of the turnbuckles 25 and 26. The studs of the ball joints 27 and 28 are attached to one end of steering arms 31 and 32, the other ends of which are attached to dirigible wheels 33 and 34 of the vehicle.

The combinations of the ball joints 21, 22, the tie rods 23, 24, the turnbuckles 25, 26, and the ball joints 27, 28 are referred to as tie rod linkages connecting the centerlink 17 with the wheel arms 31, 32. For example, the components 21, 23, 25, 27, 29 comprise a tie rod linkage 35. It can be seen that the effective length of the linkage 35 can be determined by the turnbuckle 25 which has threads of opposite hand in either end thereof so that rotating the turnbuckle will either draw the rod-like members 29 and 23 closer together or force them farther apart. By adjusting the turnbuckles 25 and 26, the wheels 33 and 34 can be brought into proper alignment which is maintained to provide parallel steering of both wheels from the Pitman arm 11.

In order to prevent the length of the tie rod assemblies such as 35 from changing during operation of the vehicle, it is desirable to increase the gripping relationship between the adjusting turnbuckles 25 and 26 and the rod-like members threaded thereinto.

FIGURE 2 illustrates a prior art method of increasing the gripping relationship where two pivot joints 50 and 51 are shown with externally threaded stems 52 and 53, the thread of the stem 52 being of opposite hand from the thread of the stem 53. The stems 52 and 53 are threaded into opposite ends of a turnbuckle cylinder 54 which is internally threaded from the ends thereof with threads of opposite hand. It can therefore be seen that with the stems 52 and 53 threaded into the turnbuckle cylinder 54, that rotating the cylinder will either cause the stems to be drawn further into the cylinder or forced out of it depending upon the direction of rotation of the cylinder. The cylinder 54 is split longitudinally for at least a portion of its length from each end thereof as at 55. Clamping brackets 56 are provided circumferentially around the cylinder 54 adjacent the ends thereof and overlying the splits 55. The clamps 56 are of the type having a bolt 57 projecting between two outturned flanges and adapted to mate with a nut on the outside of one of the flanges, the head of the bolt being on the outside of the other flange. Therefore tightening of the nut 57 draws the two spaced-apart flanges together to circumferentially constrict the clamp, thereby constricting the cylinder 54, decreasing the circumferential spacing of the splits 55.

FIGURE 3 illustrates a turnbuckle cylinder and clamps of the present invention. The cylinder 60 is of a standard type having internal threads 61 and 62 of opposite hand extending thereinto from either end thereof. The cylinder 60 has a longitudinal split 63 extending axially the length of the cylinder. Two circumferential bulges 64 and 65 are provided around the cylinder in spaced relationship from the ends thereof. While the bulges in FIGURE 3 are illustrated as being formed by crimping of the cylinder 60, it is to be understood that other methods may be utilized in forming the bulges. It is further to be understood that the provision of the bulges does not affect the interior threads 61 and 62. The provision of the longitudinal split 63 allows the cylinder 60 to be circumferentially compressed thereby decreasing the diameter of the cylinder. The cylinder 60 is normally made of material such as steel having a sufficient hardness and wall thickness so as to retain its shape and have a resistance to circumferential compression and resilience therefrom.

Clamps 67 for the cylinder 60 are illustrated as being frusto-conical collars tapered both interiorly and exteriorly having a large diameter end 68 and a small diameter end 69. The large diameter end 68 may have a diameter greater than the diameter of the bulges 64 and 65 in the free state of the cylinder 60 while the small diameter end 69 has an interior diameter less than the diameter of the bulges while the cylinder 60 is in its compressed state. Although as described above, the inside diameter of the large diameter end 68 may have a diameter greater than the diameter of the bulges 64 and 65, the large diameter end may also have a diameter slightly smaller than or equal to the outside diameter of the bulges 64 and 65 so that the collar has to be forced over the bulges initially.

In assembling a tie rod according to this invention, the male threaded ends of the joint assemblies are threaded into the respective ends of the cylinder 60 while the collars 67 are loosely received around the cylinder. After adjusting the length of the system to the desired point, the collars are then pushed over the bulges to constrict the cylinder 60 into tight gripping relation with the rod-like ends of the joint. This assembly is shown completed in FIGURE 4 where the rod-like ends 70 and 71 of joints 72 and 73 have been threaded into the ends 74 and 75 of the cylinder 60 and the collars 67 have been drawn over the bulges.

The collars 67 are constructed of a material having sufficient strength and rigidity to contract the split cylinder 60 into fixed clamped engagement with the inserted rods. However, as is illustrated in FIGURE 5, the collars 67 are designed to bend or arcuately taper themselves over the bulge 65. The collars 65 may have prior to assembly straight interior 76 and exterior 77 faces as illustrated in FIGURE 3. However, after assembly over the bulges 65, the cone will distort as shown in FIGURE 5. This distortion can be used as a check to insure that the collar 67 is properly assembled.

At assembly, the elastic deformation will always take place on the collar and the deformation may yield the material locally around the bulge 65 without changing the effectiveness of the clamp. This elastic deformation or arcuate bending of the collars 67 provides an additional check beyond that of frictional engagement in preventing the collar from sliding off of the bulge during operation of the assembly.

FIGURE 6 illustrates the stress distribution in the collar 67 of FIGURE 5. It can be seen from the line 80 representing a stress curve from the zero or base line 81, that the stress is greatest at the point 82 equivalent to the point of greatest diameter of the bulge 65 and that the stress is practically nil at the end points 83 and 84 of the line equivalent to the ends 85 and 86 of the collar 67. It is this centralizing of the stress in the central portions of the collars 67 inwardly from the ends which causes the elastic deformation of the collar. The elastic deformation is illustrated in FIGURE 5 with reference to a straight base line 87 illustrating the plane of the collar 67 in its unstressed state.

FIGURE 5 also illustrates a modified form of the end 75 of the cylinder 60 which is adapted to retain the collar 67 around the cylinder prior to final clamping of the cylinder. A small increased diameter bulge 89 is provided at the axial end of the cylinder 60. The bulge 89 has an outside diameter slightly greater than the inside diameter of the small diameter end 86 of the collar. Therefore, after the collar 67 has been initially forced over the bulge 89, the presence of the bulge will prevent the collar from falling off of the cylinder 60. This allows the cylinder and collars to be pre-assembled and shipped as a unit prior to assembly into a turnbuckle arrangement.

FIGURE 7 illustrates a modified embodiment of the turnbuckle cylinder and clamping device of the present invention. In this embodiment the collars 90 are substantially the same as the collars 67 and the turnbuckle cylinder 91 differs from the cylinder 60 only insofar as the bulges 65 are absent while the ends 92 and 93 are flared radially outwardly. This provides an increased diameter area at the ends of the cylinder 91 rather than intermediate the ends as in the case of the bulges 65 of the cylinder 60. The cylinder 91 has split ends 95 but could obviously be provided with a split gap along its entire length.

The collars 90 are assembled on the cylinder 91 prior to flaring of the ends 92 and 93. The collars are assembled with their large diameter end facing axially outward. It can thus be seen that after insertion of threaded rod members into the opposite ends 92 and 93 of the cylinder, that if the collars are then forced axially outwardly over the flanges, the ends 92 and 93 will be circumferentially compressed around the rod-like members threaded thereinto. This action is substantially the same as that described above in connection with FIGURE 5 and the collars 90 will encounter stress deformation the same as the collars 67.

The embodiment illustrated in FIGURE 8 has the advantage of being able to be shipped as a pre-assembled unit of both the cylinder 91 and the clamping devices 90 and requires no assembly of components at the point of installation. After threading the rod members into the turnbuckle all that remains to be done to set the turnbuckle locking up the assembly is to force the collars 90 axially outward over the flared ends 92 and 93 thereby compressing the collar 91 at the ends thereof into tight gripping relationship with the rod members as shown in FIGURE 8.

FIGURE 9 illustrates a modified collar 100 which has a roughed up interior surface 101 to provide a plurality of gripping edges 102 therearound. The collar illustrated in FIGURE 9 has the edges formed by a spiral groove cut into the wall of the collar. The grooves are cut on an angle to provide gripping ledges thereby forming a plurality of serrated teeth which will bite into the bulges 64 and 65 of the cylinder. The teeth aid in retaining the collar around the cylinder bulges 64 and 65. It is of course to be understood that other methods of roughing up the interior wall such as a sandpaper finish may be used.

It can therefore be seen from the above that my invention provides for a novel and improved method and structure of clamping a turnbuckle securely around rod-like members inserted therein without the requirement of screw adjustment or the like. Further, the invention is easily adapted to automatic installation machinery and provides for constriction of the turnbuckle cylinder by forcing reduced diameter portions of a collar or collars circumferentially around an increased diameter portion of the turnbuckle cylinder. It is to be understood that although I have described my invention as comprising a circumferentially extending bulge, flange or increased diameter extending portion that the principles of the invention can be effectively worked with an interrupted or intermittent increased diameter portion.

Although I have herein set forth my invention with respect to certain specific principles and details thereof, it will be understood that these may be varied.

I claim as my invention:

1. The method of joining two components together which comprises:
 inserting a portion of each of the members to be joined into an opposite end of a hollow cylinder,
 providing a longitudinal split in said cylinder to allow it to be circumferentially compressed,
 providing increased diameter portions around the cylinder adjacent the ends thereof,
 forcing hollow tapered interior collars over said increased diameter portions to circumferentially constrict the cylinder and stress deforming said collars to arcuately curve them around the bulges.

2. The method of claim 1 wherein the portions are threaded into the cylinder in opposite rotational directions providing a turnbuckle assembly.

3. The method of claim 2 wherein the circumferential constriction of the cylinder clamps the threads of the portions and cylinder into non-rotatable fixed relation.

4. A clamping assembly comprising:
 a hollow cylinder,
 said cylinder having a longitudinal split extending axially for at least a portion of the length thereof,
 said cylinder having at least one localized increased diameter portion adjacent an end thereof,
 a hollow collar,
 said collar having a tapered interior with a large diameter end and a small diameter end,
 the said large diameter end having a diameter greater than the said increased diameter portion of the cylinder,
 and the said collar adapted to be drawn over the said increased diameter portion of the cylinder to circumferentially constrict the said cylinder.

5. A turnbuckle assembly comprising:
 a sleeve,
 internal threads of opposite hand in the ends of the sleeve,
 said sleeve having a longitudinal cleft gap along the lengths of the internal threads,
 externally threaded rods threaded into the ends of the sleeve, increased diameter portions on the sleeve near the ends thereof, and
 tapered collars on the sleeve having large diameter ends freely receiving the increased diameter portions and small diameter ends too small to receive said portions,
 whereby forcing of the collars onto the increased diameter portions will reduce the cleft gap and constrict the sleeve into locked threaded engagement with the rods.

6. The turnbuckle of claim 5 where the increased diameter portions are hollow bulges spaced inwardly from the ends of the sleeve.

7. The turnbuckle of claim 5 wherein the increased diameter portions are outwardly flaring flanges on the ends of the sleeve.

8 The assembly of claim 4 wherein the collar is curved around the increased diameter portion.

9. The assembly of claim 4 wherein the collar in its free state is frusto-conical.

10. The assembly of claim 9 wherein the collar is deformed from its free state by the increased diameter portion to bow over said portion.

11. A turnbuckle assembly comprising:
 a sleeve,
 internal threads of opposite hand in the ends of the sleeve,
 said sleeve having a longitudinal cleft gap along the length of the internal threads,
 externally threaded rods threaded into the ends of the sleeve,
 increased diameter portions intermediate the ends of the sleeve spaced from the said ends,
 tapered interior collars on the sleeve having large diameter ends having substantially the same diameter as the increased diameter portions and small diameter ends having a diameter less than the said increased diameter portions, and
said collars having a rough interior surface adapted to grip the exterior periphery of the said increased diameter portions.

12. The assembly of claim 11 wherein the said sleeve has additional increased diameter portions adjacent the ends thereof,
said additional increased diameter portions having an exterior diameter slightly greater than the interior diameter of the said small diameter ends of the said collars.

13. The assembly of claim 4 wherein the said collar has a rough interior surface providing gripping edges adapted to retain the collar around the said increased diameter portion of the said cylinder.

References Cited

UNITED STATES PATENTS

| 35,355 | 5/1862 | Vosburg et al. | 287—108 |
| 1,673,738 | 6/1928 | Dibner | 287—114 X |
| 2,160,694 | 5/1939 | Buchanan | 287—118 X |
| 2,526,470 | 10/1950 | Gauthier | 287—62 X |
| 2,895,756 | 7/1959 | Gair | 287—62 |

FOREIGN PATENTS 809,940  3/1959  Great Britain.

DAVID J. WILLIAMOWSKY, Primary Examiner

W. L. SHEDD, Assistant Examiner

U.S. Cl. X.R.

287—111, 117, 118